United States Patent
Ganapathiappan et al.

(10) Patent No.: US 8,273,933 B2
(45) Date of Patent: Sep. 25, 2012

(54) FUNCTIONALIZED LATEX POLYMER AND METHOD OF FORMING THE SAME

(75) Inventors: Sivapackia Ganapathiappan, Palo Alto, CA (US); Zhang-Lin Zhou, Palo Alto, CA (US); Kent Vincent, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/051,812

(22) Filed: Mar. 18, 2011

(65) Prior Publication Data

US 2011/0172358 A1    Jul. 14, 2011

Related U.S. Application Data

(62) Division of application No. 11/452,845, filed on Jun. 14, 2006, now abandoned.

(51) Int. Cl.
*C08L 27/00* (2006.01)
*C08F 20/06* (2006.01)

(52) U.S. Cl. ........ 585/477; 524/833; 525/213; 525/223; 525/359.3; 526/317.1; 526/318; 526/320

(58) Field of Classification Search ................. 526/320, 526/318, 317.1; 525/213, 223, 359.3; 585/477; 524/833
See application file for complete search history.

(56) References Cited

U.S. PATENT DOCUMENTS

| | | | |
|---|---|---|---|
| 4,496,708 A | 1/1985 | Dehm et al. | |
| 4,579,911 A | 4/1986 | D'Sidocky et al. | |
| 5,610,225 A * | 3/1997 | Farwaha et al. | 524/558 |
| 5,618,888 A | 4/1997 | Choi et al. | |
| 2002/0151650 A1 * | 10/2002 | Pathak et al. | 525/90 |
| 2003/0197773 A1 | 10/2003 | Kaeding et al. | |
| 2003/0198761 A1 | 10/2003 | Kaeding et al. | |
| 2004/0157956 A1 | 8/2004 | Vincent et al. | |
| 2004/0157957 A1 | 8/2004 | Ganapathiappan et al. | |
| 2004/0157958 A1 | 8/2004 | Vincent et al. | |
| 2004/0176527 A1 | 9/2004 | Aert et al. | |
| 2005/0159507 A1 | 7/2005 | Leon et al. | |

FOREIGN PATENT DOCUMENTS

| | | | |
|---|---|---|---|
| WO | WO 94/24202 | * | 10/1994 |
| WO | WO9424202 | | 10/1994 |

* cited by examiner

*Primary Examiner* — Ling Choi
*Assistant Examiner* — Chun-Cheng Wang

(57) ABSTRACT

A method for forming a functionalized latex polymer includes polymerizing a heterogeneous dispersion of water insoluble monomers in water, thereby forming a latex polymer. An at least partially water soluble halogenated non-ionic group is reacted with the latex polymer, whereby a halogen is displaced from the non-ionic group, thereby forming an at least partially water soluble non-ionic group that attaches to the latex polymer.

14 Claims, 2 Drawing Sheets

FUNCTIONALIZED LATEX POLYMER AND METHOD OF FORMING THE SAME

CROSS-REFERENCE TO RELATED APPLICATION

The present application is a divisional application of application Ser. No. 11/452,845, filed Jun. 14, 2006, now abandoned the contents of which are incorporated by reference herein.

BACKGROUND

The present disclosure relates generally to functionalized latex polymers and methods for forming the same.

Latex polymers are suitable for use in a variety of applications. Generally, such polymers are stabilized by anions. The stabilization is due, at least in part, to the repulsion of negative charges between the polymers. The anionic charges may be incorporated into the polymer using polymerizable acid containing monomers during emulsion polymerization of acrylic and styrenic monomers. When the pH of the system is greater than about 7, charges are generated on the surface of the latex polymers.

The charges that are introduced into the polymers as a result of anionic stabilization may potentially be disadvantageous. The charged polymers may, in some instances, have a relatively high hydrophilic nature and propensity to interact with other components present in the system in which the polymers are incorporated. These characteristics may limit the applications in which the charged polymers may be used.

One system into which the charged polymers may be incorporated is an inkjet ink system. However, in the images printed with such ink systems, an undesirable loss of gloss may result in some instances.

SUMMARY

A method for forming a functionalized latex polymer is disclosed. The method includes polymerizing a heterogeneous dispersion of water insoluble monomers in water, thereby forming a latex polymer. An at least partially water soluble halogenated non-ionic group is reacted with the latex polymer, whereby a halogen is displaced from the non-ionic group, thereby forming an at least partially water soluble non-ionic group that attaches to the latex polymer.

BRIEF DESCRIPTION OF THE DRAWINGS

Features and advantages of embodiments of the present disclosure will become apparent by reference to the following detailed description and drawings, in which like reference numerals correspond to similar, though not necessarily identical components. For the sake of brevity, reference numerals or features having a previously described function may not necessarily be described in connection with other drawings in which they appear.

DETAILED DESCRIPTION

Embodiments of the method disclosed herein advantageously form a stabilized, functionalized latex polymer without incorporating charges into the polymer. The method involves incorporating non-ionic groups into the polymer in water, substantially without generating undesired side products. Without being bound to any theory, it is believed that the resultant latex polymers exhibit substantially enhanced durability and stability when compared to latex polymers stabilized with anionic charges.

Figure 1:
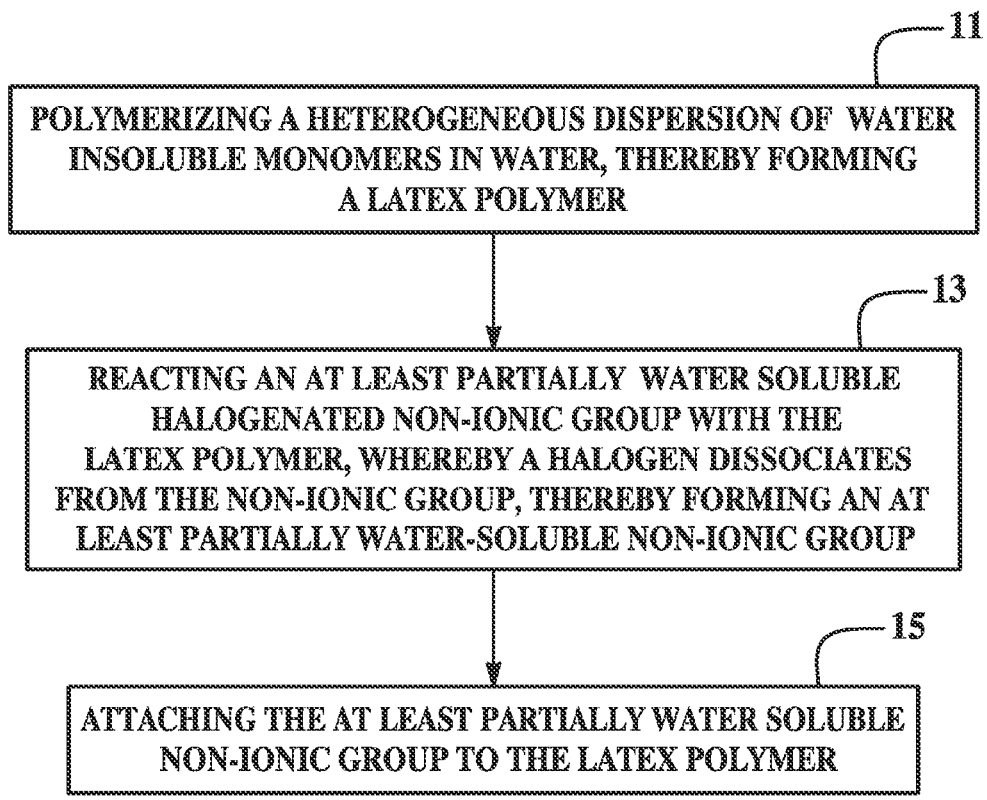
FIG. 1 is a flow chart depicting an embodiment of a method of forming a functionalized latex polymer.

Referring now to FIG. 1, an embodiment of forming a functionalized latex polymer is disclosed. Generally, the method includes polymerizing a heterogeneous dispersion of water insoluble monomers in water, thereby forming a latex polymer, as shown at reference numeral 11. An at least partially water soluble (i.e., partially or fully water soluble) halogenated non-ionic group is reacted with the latex polymer, whereby a halogen is displaced from the non-ionic group, thereby forming an at least partially water soluble non-ionic group, as shown at reference numeral 13. The at least partially water soluble non-ionic group attaches to the latex polymer, thereby functionalizing the latex polymer, as shown at reference numeral 15. It is to be understood that embodiment(s) of the method will be disclosed in more detail in reference to FIGS. 2-4.

Figure 2:
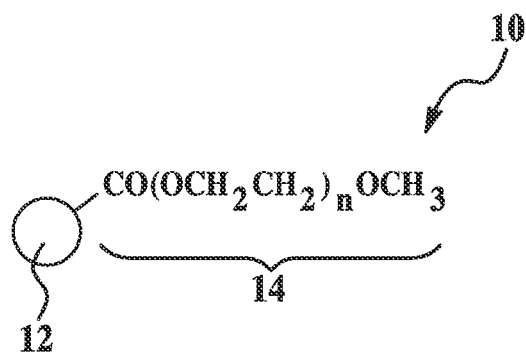
FIG. 2 is a schematic diagram of an embodiment of a functionalized latex polymer.

FIG. 2 depicts a generic embodiment of the functionalized latex polymer 10. The functionalized latex polymer 10 includes a latex polymer 12 and an at least partially water soluble non-ionic group 14 attached thereto.

The latex polymer 12 is formed from the polymerization of a heterogeneous dispersion of monomers in water. Non-limitative examples of such monomers include hexyl methacrylate, methacryloyloxyethyl succinate, styrene, methylstyrene, divinylbenzene, vinylbenzyl chloride, ethyl (meth)acrylate, butyl (meth)acrylate, hexyl acrylate, 2-ethylhexyl (meth)acrylate, octyl (meth)acrylate, lauryl (meth)acrylate, 3-vinylbenzoic acid, 4-vinylbenzoic acid, (meth)acrylic acid, methacryloxyethyl phosphate, maleic acid, itaconic acid, ethylene glycol di(meth)acrylate, pentaerythritol tri(meth)acrylate, pentaerythritol tetra(meth)acrylate, hydroxyethyl (meth)acrylate, or the like, or combinations thereof. The heterogeneous characteristics induce phase separation within the dispersion.

Polymerization of the monomers may be accomplished by emulsifying the monomers in the presence of surfactants, initiators, or the like, or combinations thereof. It is to be understood that any suitable surfactant, initiator, or combinations thereof may be used. Examples of suitable surfactants include, but are not limited to phosphate ester surfactants (such as RHODAFAC RS 710, which is commercially available from Rhodia, Inc., located in Cranbury, N.J.); sodium dodecyl sulfate; octylphenol ethoxylates (such as TRITON X 100, which is commercially available from the Dow Chemical Co., located in Midland, Mich.); ethoxylates of alcohols, amines, amides or acids (such as LUTENSOL AT 50, which is commercially available from BASF Corp., located in Florham Park, N.J.); cationic surfactants (such as cetyltrimethylammonium bromide), or the like, or combinations thereof. Examples of suitable initiators include, but are not limited to, potassium persulfate, ammonium persulfate, peroxides, 2,2'-azobis(2-methylpropionamidine) dihydrochloride, or combinations thereof.

The emulsion (including the monomers and any additives) is heated in the presence of water. Heating may be accomplished at a temperature ranging from about 40° C. to about 98° C. In a non-limitative example, the emulsion is heated to about 90° C. Once heating is performed for a desirable amount of time, the emulsion is cooled to ambient temperature, and the latex polymer 12 is formed.

The latex polymer 12 (prior to reacting with the at least partially water soluble halogenated non-ionic group) may be an anionic latex polymer having a surface group attached thereto. In an embodiment, the surface group(s) is/are carboxy) groups. The pH of the anionic latex polymer 12 may be raised (e.g., to a pH of 7 or greater) via exposure to a base (e.g., hydroxides, carbonates, organic amines, or the like) (as shown in, and discussed in more detail in reference to FIG. 4).

In an embodiment of the method of forming the functionalized latex polymer 10, the latex polymer 12 is reacted with a halogenated non-ionic group 16 that is partially water soluble or fully water soluble. During this reaction, the halogen of the group 16 is displaced to form the at least partially water soluble non-ionic group 14, which is adapted to attach to the latex polymer 12. The displacement of the halogen is due, at least in part, to the relatively weak bond between the halogen and a carbon atom of the group 16. As such, a nucleophilic substitution is able to take place. The amount of side product(s) formed during this reaction is generally so small that the properties of the functionalized latex polymer 10 are substantially unaffected.

Any suitable partially water soluble or fully water soluble halogenated non-ionic group 16 may be used to form the functionalized latex polymer 10. Examples of the at least partially water soluble halogenated non-ionic group 16 include, but are not limited to, halogenated polyethylene glycol (a non-limitative example of which include iodo polyethylene glycol), halogenated polypropylene glycol, halogenated poly(propylene oxide), halogenated mixtures of ethylene and propylene oxide, or the like, or combinations thereof.

Figure 3:
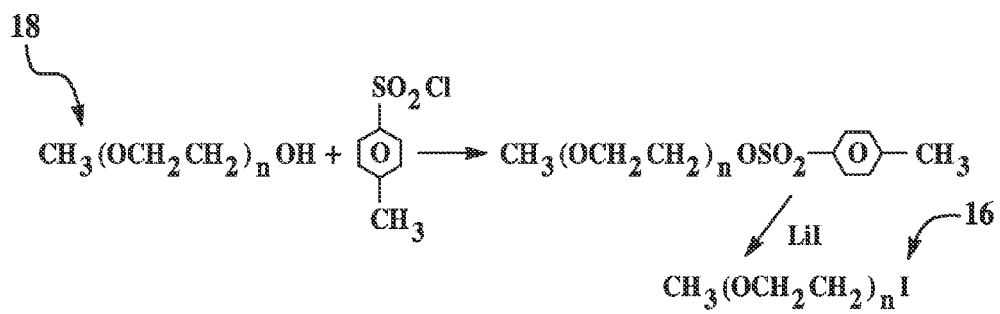
FIG. 3 is a schematic diagram of an embodiment of forming a water soluble halogenated non-ionic group.

FIG. 3 depicts a method of forming the at least partially water soluble halogenated non-ionic group 16. Generally, the at least partially water soluble halogenated non-ionic group 16 is formed by incorporating a halogen (e.g., I, Cl, Br, etc.) into a non-ionic compound 18 having an alcohol end group. It is to be understood that the chain length "n" (where "n" is an integer ranging from 1 to 200) of the at least partially water soluble non-ionic group 14 depends, at least in part, on the chain length "n" of the alcohol-containing compound 18 selected to form the at least partially water soluble halogenated non-ionic group 16.

In the example embodiment depicted in FIG. 3, methoxy polyethylene glycol 18 is reacted with p-toluenesulfonyl chloride in the presence of pyridine to form a p-toluenesulfonyl derivative. The p-toluenesulfonyl derivative is treated with a halogen-containing compound (e.g., lithium iodide) to displace the p-toluenesulfonyl group and form the halogenated non-ionic group 16 (e.g., iodo polyethylene glycol).

Figure 4:
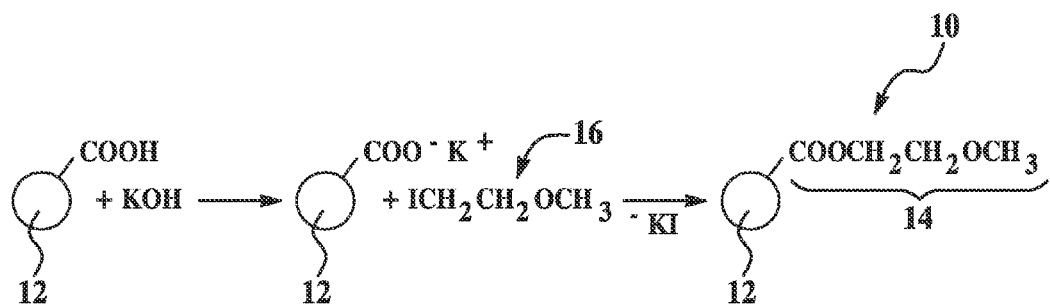
FIG. 4 is a schematic diagram of an embodiment of forming a functionalized latex polymer.

Referring now to FIG. 4, an embodiment of attaching the at least partially water soluble non-ionic group 14 to the latex particle 12 is depicted. As shown, an anionic latex particle 12 has a —COOH surface group attached thereto. As previously discussed, the surface group may be neutralized via a base (e.g., a hydroxide compound). In an embodiment, the base is potassium hydroxide (KOH), and the latex polymer 12 is neutralized, for example, to a pH ranging from about 7 to about 11. Other non-limiting examples of suitable bases include potassium carbonate, organic amines (e.g., ethylamine, propylamine, butylamine, or the like), or combinations thereof.

As depicted, the neutralized latex polymer 12 is reacted with the at least partially water soluble halogenated non-ionic group 16. The anion that is generated during neutralization reacts with the halogen of the at least partially water soluble halogenated non-ionic group 16, thereby displacing the halogen to form the at least partially water soluble non-ionic group 14.

The at least partially water soluble non-ionic group 14 attaches to the latex polymer 12, thereby stabilizing the polymer 12 to form the functionalized latex polymer 10. In a non-limitative example, the functionalized latex polymer 10 is at least partially hydrophobic. It is to be understood however, that the acid or non-ionic group(s) 14 generally introduce at least some degree of hydrophilicity into the functionalized latex polymer.

To further illustrate embodiment(s) of the present disclosure, the following example is given. It is to be understood that this example is provided for illustrative purposes and is not to be construed as limiting the scope of embodiment(s) of the present disclosure.

EXAMPLE

Formation of a Halogenated Water Soluble Non-Ionic Group

An iodo polyethylene glycol was formed by first treating methoxy polyethylene glycol with p-toluenesulfonyl chloride in the presence of pyridine to form a p-toluenesulfonyl derivative. The p-toluenesulfonyl derivative was treated with lithium iodide to displace the p-toluenesulfonyl group and form the iodo polyethylene glycol.

Formation of a Latex Polymer

About 34 g of hexyl methacrylate and about 6 g of methacryloyloxyethyl succinate were mixed in about 10 mL of water. The mixture was emulsified with the surfactant Rhodafac RS 710 (about 3.32 g of 30% in water). About 80 mL of water was heated to about 90° C. in a reactor. About 0.2 g of potassium persulfate was added to the water in the reactor. The emulsion was added to the reactor over a period of about 7 minutes. The reactor (having the emulsion, water, and potassium persulfate therein) was maintained at about 90° C. for about 2 hours, and was then cooled to ambient temperature to obtain the latex polymer having carboxy surface groups.

Formation of a Functionalized Latex Polymer

About 10 g of the latex polymer having carboxy surface groups was then mixed with dilute potassium hydroxide to increase the pH to about 9. The neutralized latex polymer was reacted with about 1.12 g of the iodo polyethylene glycol. The reaction mixture was heated to about 90° C. for about 3 hours, was cooled to about 75° C. for about 64 hours, and then was cooled to ambient temperature to obtain the latex polymer with ethylene glycol pendant group(s).

It is to be understood that the stabilized, functionalized latex polymers 10 disclosed herein may be used in a variety of applications. Some potential applications in which the polymers 10 may be used include the following: colloid applications (a non-limitative example of which include using the polymers 10 as model colloids for calibration of instruments used to measure particle sizes; biological applications (non-limitative examples of which include immobilizing of biomolecules (e.g., proteins or peptides) on the polymer 10 surfaces or developing immunoassays); inkjet applications (non-limitative examples of which include printing, painting, coating, or the like); or combinations thereof.

In an embodiment in which the functionalized latex polymers 10 are included in inkjet inks, the polymers 10 may be cross-linked with a multimer(s) (from about 0.5% to about 10%) during emulsion polymerization. As used herein, the term "multimer" refers to 1) a molecule having two or more reactive groups (e.g., two or more unsaturated ethylene groups) that allow its reaction with a polymer matrix in two or more places; and/or 2) a monomer having two or more reactive groups that can polymerize or copolymerize in the presence of radicals. Non-limitative examples of multimers include dimers, trimers, tetramers, pentamers, or the like. Non-limitative examples of suitable multimers include ethylene glycol di(meth)acrylate, propylene glycol di(meth)acrylate, divinylbenzene, pentaerythritol triacrylate, pentaerythritol tetraacrylate, or the like, or combinations thereof. The crosslinked functionalized polymers 10 are incorporated into the inkjet ink composition. In the images printed with such inkjet ink compositions, a satisfactory gloss level may be achieved.

Embodiments of the method and functionalized/stabilized latex polymer 10 disclosed herein include, but are not limited to the follow advantages. The method allows for the formation of the stabilized, functionalized latex polymer 10 without anionic charges remaining in the stabilized polymer 10. Furthermore, the method involves incorporating non-ionic groups 14 into the polymer 10 in water, substantially without generating undesirable side products during the reaction. Without being bound to any theory, it is believed that the resultant latex polymers 10 exhibit substantially enhanced durability and stability when compared to latex polymers stabilized with anionic charges.

While several embodiments have been described in detail, it will be apparent to those skilled in the art that the disclosed embodiments may be modified. Therefore, the foregoing description is to be considered exemplary rather than limiting.

What is claimed is:

1. A method for forming a functionalized latex polymer, comprising:
    polymerizing a heterogeneous dispersion of water insoluble monomers in water, thereby forming a latex polymer; and
    reacting an at least partially water soluble halogenated non-ionic compound with the latex polymer, whereby a halogen is displaced from the halogenated non-ionic compound, thereby forming an at least partially water soluble non-ionic group that attaches to the latex polymer.

2. The method as defined in claim 1 wherein the at least partially water soluble non-ionic group functionalizes the latex polymer.

3. The method as defined in claim 1 wherein the polymerization is accomplished by:
    emulsifying the heterogeneous dispersion of monomers in water with a surfactant, thereby forming an emulsion;
    adding an initiator to the emulsion; and
    heating the emulsion.

4. The method as defined in claim 3 wherein the initiator is potassium persulfate, ammonium persulfate, peroxides, 2,2'-azobis(2-methylpropionamidine) dihydrochloride, or combinations thereof.

5. The method as defined in claim 1 wherein the at least partially water soluble halogenated non-ionic compound is selected from halogenated polyethylene glycol, halogenated polypropylene glycol, halogenated poly(propylene oxide), halogenated mixtures of ethylene and propylene oxide, and combinations thereof.

6. The method as defined in claim 1 wherein prior to reacting, the method further includes forming the at least partially water soluble halogenated non-ionic compound by incorporating a halogen into a non-ionic compound having an alcohol end group.

7. The method as defined in claim 6 wherein incorporating the halogen is accomplished by:
    reacting methoxy polyethylene glycol with p-toluenesulfonyl chloride in the presence of pyridine to form a p-toluenesulfonated derivative; and
    reacting the p-toluenesulfonated derivative with lithium iodide to form an iodo polyethylene glycol derivative.

8. The method as defined in claim 1 wherein the latex polymer has a carboxy surface group attached thereto, and wherein the method further includes exposing the polymer to a base, thereby increasing a pH of the latex polymer to a level ranging from about 7 to about 11.

9. The method as defined in claim 1 wherein prior to reacting, the method further comprises increasing a pH of the latex polymer to a level ranging from about 7 to about 11.

10. The method as defined in claim 9 wherein increasing the pH of the latex polymer includes exposing the polymer to a base.

11. A method for using a functionalized latex polymer formed by the method of claim 1, comprising:
    crosslinking the functionalized latex polymer with an effective amount of a multimer during the polymerization process; and
    incorporating the crosslinked functionalized latex polymer in an inkjet ink composition.

12. A method for forming a functionalized latex polymer, comprising:
    forming an at least partially water soluble halogenated non-ionic compound by incorporating a halogen into a non-ionic compound having an alcohol end group;
    polymerizing a heterogeneous dispersion of water insoluble monomers in water, thereby forming a latex polymer;
    increasing a pH of the latex polymer to a level ranging from about 7 to about 11 by exposing the latex polymer to a base; and
    reacting the at least partially water soluble halogenated non-ionic compound with the latex polymer, whereby a halogen is displaced from the halogenated non-ionic compound, thereby forming an at least partially water soluble non-ionic group that attaches to the latex polymer.

13. The method as defined in claim 12 wherein the polymerization is accomplished by:
    emulsifying the heterogeneous dispersion of monomers in water with a surfactant, thereby forming an emulsion;
    adding an initiator to the emulsion; and
    heating the emulsion.

14. The method as defined in claim 12 wherein incorporating the halogen is accomplished by:
    reacting methoxy polyethylene glycol with p-toluenesulfonyl chloride in the presence of pyridine to form a p-toluenesulfonated derivative; and
    reacting the p-toluenesulfonated derivative with lithium iodide to form an iodo polyethylene glycol derivative.

* * * * *